Oct. 27, 1942.                G. E. SWARTZ                2,300,023
                    SHAFT OPERATING AND LOCKING DEVICE
                          Filed Nov. 17, 1941

INVENTOR.
GUY E. SWARTZ
BY Susan Frye & Hardesty
ATTORNEYS

Patented Oct. 27, 1942

2,300,023

UNITED STATES PATENT OFFICE 2,300,023

SHAFT OPERATING AND LOCKING DEVICE

Guy E. Swartz, Detroit, Mich.

Application November 17, 1941, Serial No. 419,460

3 Claims. (Cl. 192—8)

The present invention relates to devices for driving a shaft and locking it against reverse movement and relates specifically to such devices as applied to "locking fixtures" for holding work pieces while the latter are subjected to machining operations.

Driving and locking devices of the type herein described are described and claimed in U. S. Letters Patent Nos. 1,982,886 issued Dec. 4, 1934, and 2,066,167 issued Dec. 29, 1936, to the present inventor and the present invention may be considered an improvement thereon.

Among the objects of the present invention is to improve the functioning of such devices as those shown in the patents by providing braking means for holding the parts in any desired position whether or not they are in locking position.

Another object is to provide a device of the kind described that is free from "chatter" and therefore smooth in operation.

Still another object is to provide means for restoring the locking key to its radial position if and when it has been tilted and thereby establish or re-establish full contact with the housing.

Other objects will readily occur to those skilled in the art upon reference to the following description and the accompanying drawing in which Figure 1 is a sectional view of the locking device taken on line 1—1 of Figure 2.

Figure 1:
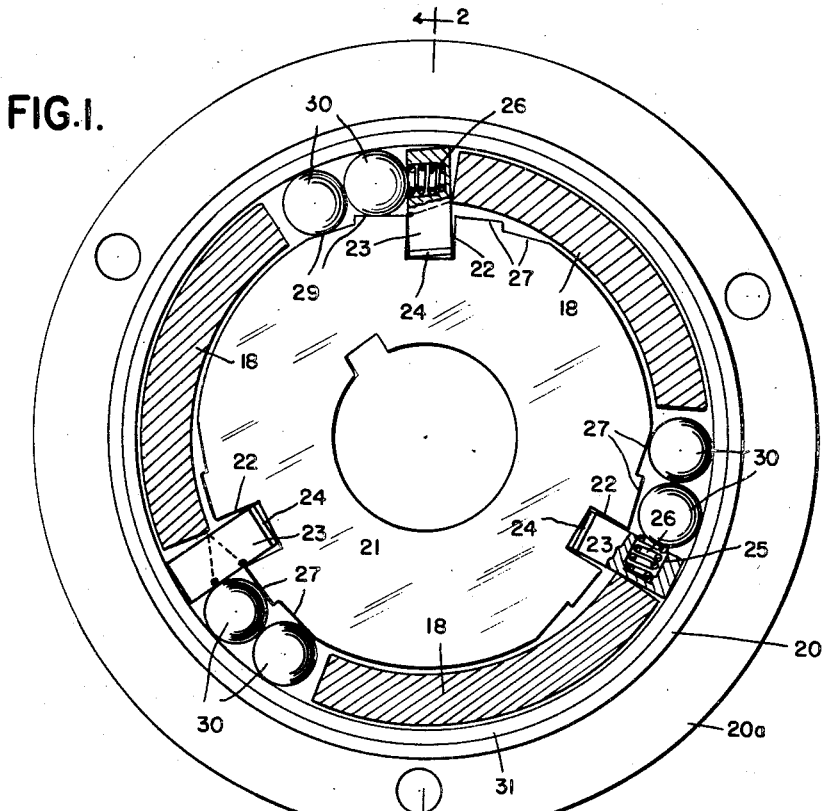
Figure 2:
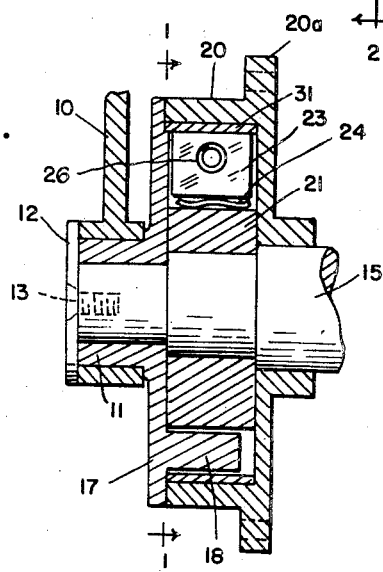
Figure 2 is a sectional view of the same on line 2—2 of Fig. 1.
Figure 3:
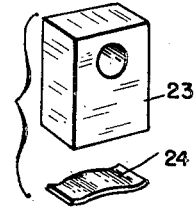
Figure 3 is a detail showing a key and its under spring.

In the drawing, a suitable operating handle is indicated at 10, this being fixed in any suitable manner against rotation relative to the hub 11, such as mating polygonal portions. The handle may be held in place by means of a plate 12, in turn secured by screw 13 to the shaft 15.

The hub 11 forms part of a cover plate 17 closing the outer end of housing 20, and provided with driving fingers 18 in the form of arc-shaped members extending into the housing 20 near the inner periphery. Three of such fingers 18 are shown but a different number may be used if desired.

The shaft 15, as indicated, passes through the housing 20 and cover 17 and has fixed upon it, within the housing, a cam or clutch member 21, shown in elevation in Figure 1.

This cam or clutch member 21 is a symmetrical generally circular member provided at equispaced intervals about its periphery with a plurality of radial notches or slots 22 and on each side of each slot 22 is provided with a plurality of clutch surfaces 27 all inclined toward the slots. The member 21 is of sufficiently smaller diameter than the interior of the housing to permit entry of the fingers 18 into the peripheral space between.

In each of the slots 22 is a key member 23 of such thickness as to fit loosely therein and long enough to extend from near the bottom of the slot to contact the inner wall of the housing, while in the bottom of the slot is placed a relatively stiff spring 24 adapted to press the key 23 outwardly against the said inner wall.

Each of the keys 23, at a point opposite the space between the member 21 and housing is provided with a counterbored socket 25, the bottom of which is somewhat smaller than the remainder, and into each socket is pressed a short helical spring 26, the said smaller bottom portion of the socket serving to hold the spring against displacement.

Also in the space between the member 21 and the inner wall of the housing 20 are placed a plurality of rollers 30, these being located at the socket side of each key 23 and being in number as many as there are clutch surfaces 27 at that side.

These rollers 30 are of such size as to permit wedging or jamming between a surface 27 and the inner wall of the housing to act as a clutch therebetween.

In order to reduce wear and increase the efficiency of the device, it is preferred to line the inner wall of housing 20 with a hardened ring 31.

It should be understood that the shaft 15 is the operating shaft of the device it is desired to actuate and lock and that the housing 20 is fixed to the frame or housing of that device, a flange 20a being provided for that purpose.

In the operation of the present lock, movement of the handle 10 (in driving direction) causes the fingers 18 to press against the keys 23 and these in turn to act against the opposite walls of slots 22 and to thereby rotate member 21 fixed to shaft 15.

During such movement, the rollers 30 are, of course, carried along and, being maintained by springs 26 in contact with surfaces 27 and ring 31, instantly lock the member 21 against return movement.

The springs 24 tend to maintain the keys 23 in radial position but allow them to tilt slightly under application of the force required to complete the locking operation. As soon, however, as the locking movement has been completed and the handle 10 released, the keys will instantly reassume their radial position and being pressed tightly against ring 31 act as a brake against relative movement of members 20 and 21 thereby to prevent loosening of rolls 30 by vibration.

Reverse movement of handle 10 causes the fingers 18 to first force the rolls 30 out of clutching position and by thrusting them against the keys 23 cause a reverse movement of member 21 and shaft 15.

By providing the member 21 with the extra set of clutch faces 27, when the one set becomes worn sufficiently to reduce the locking efficiency, the member 21 may be removed and replaced in its reverse position and the locking efficiency restored.

Now having described the invention and the preferred embodiment thereof, it is to be understood that said invention is to be limited, not to the foregoing description, but only by the scope of the claims which follow.

I claim:

1. In a rotating and locking device for a shaft, a generally circular driven element secured to said shaft and provided with cam surfaces, a stationary circular housing for said driven element, locking rolls between said driven element and the inner wall of said housing and adapted to be wedged therebetween to lock said driven element against return movement, a radially arranged key carried by said driven element and loosely mounted therein and projecting into the path of said rolls, resilient means carried by said keys and adapted to resiliently thrust said rolls into wedged position, driving means adapted to act against said keys to drive said driven element, and resilient means arranged to thrust said keys radially outward.

2. In a rotating and locking device for a shaft, a generally circular driven element secured to said shaft and provided with cam surfaces, a stationary circular housing for said driven element, locking rolls between said driven element and the inner wall of said housing and adapted to be wedged therebetween to lock said driven element against return movement, a radially arranged key carried by said driven element and loosely mounted therein and projecting into the path of said rolls, resilient means carried by said keys and adapted to resiliently thrust said rolls into wedged position, driving means adapted to act against said keys to drive said driven element, and means adapted to urge said key into contact with said housing to thereby exert a braking action against relative movement between the driven element and the housing.

3. In a rotating and locking device for a shaft, a generally circular driven element secured to said shaft and provided with cam surfaces, a stationary circular housing for said driven element, locking rolls between said driven element and the inner wall of said housing and adapted to be wedged therebetween to lock said driven element against return movement, radially arranged keys carried by said driven element and loosely mounted in slots therein and projecting into the path of said rolls, resilient means carried by said keys and adapted to resiliently thrust said rolls into wedged position, driving means adapted to act against said keys to drive said driven element, and leaf springs beneath said keys in said slots.

GUY E. SWARTZ.